US009821506B2

(12) United States Patent
Geltinger et al.

(10) Patent No.: US 9,821,506 B2
(45) Date of Patent: Nov. 21, 2017

(54) BLOW-MOULDING DEVICE WITH PRELOADABLE ATTACHMENT FOR BLOW MOULDS

(71) Applicant: KRONES AG, Neutraubling (DE)

(72) Inventors: Florian Geltinger, Donaustauf (DE); Maria Lindner, Hausen (DE); Thomas Philipp, Eilsbrunn (DE); Paul Brinster, Regensburg (DE)

(73) Assignee: KRONES AG (DE)

( * ) Notice: Subject to any disclaimer, the term of this patent is extended or adjusted under 35 U.S.C. 154(b) by 275 days.

(21) Appl. No.: 14/716,912

(22) Filed: May 20, 2015

(65) Prior Publication Data
US 2015/0343696 A1 Dec. 3, 2015

(30) Foreign Application Priority Data
May 28, 2014 (DE) .......................... 10 2014 107 512

(51) Int. Cl.
B29C 49/48 (2006.01)
B29C 49/56 (2006.01)
(Continued)

(52) U.S. Cl.
CPC .............. *B29C 49/30* (2013.01); *B29C 49/12* (2013.01); *B29C 49/48* (2013.01); *B29C 49/56* (2013.01); *B29C 49/06* (2013.01); *B29C 49/28* (2013.01); *B29C 49/36* (2013.01); *B29C 49/4823* (2013.01); *B29C 2049/4858* (2013.01);
(Continued)

(58) Field of Classification Search
CPC .... B29C 2049/4858; B29C 2049/4864; B29C 2049/4869; B29C 2049/4856
See application file for complete search history.

(56) References Cited

U.S. PATENT DOCUMENTS 5,968,560 A * 10/1999 Briere ................... B29C 33/305
249/102
6,729,868 B1 * 5/2004 Vogel ..................... B29C 49/56
425/195
(Continued)

FOREIGN PATENT DOCUMENTS

DE 102011052863 A1 2/2013
DE 102011052865 A1 2/2013
(Continued)

OTHER PUBLICATIONS

Chinese Office Action dated Dec. 1, 2016; Application No. 2015102848490, 7 pgs.

*Primary Examiner* — Robert B Davis
(74) *Attorney, Agent, or Firm* — Schmeiser, Olsen & Watts, LLP

(57) ABSTRACT

A transforming device for transforming plastic preforms into plastic containers, comprising a blow-molding device which forms a cavity inside which the plastic preforms can be transformed into the plastic containers through the application of a flowable medium, wherein the blow-molding device has at least two side parts which are arranged at least indirectly on blow-mold carriers, wherein the side parts are arranged on the blow-mold carriers by an attachment device is provided. The attachment device also has a return which, at least temporarily during a working mode, pushes at least one side part towards the blow-mold carrier on which the side part is arranged.

13 Claims, 7 Drawing Sheets

Figure 1:
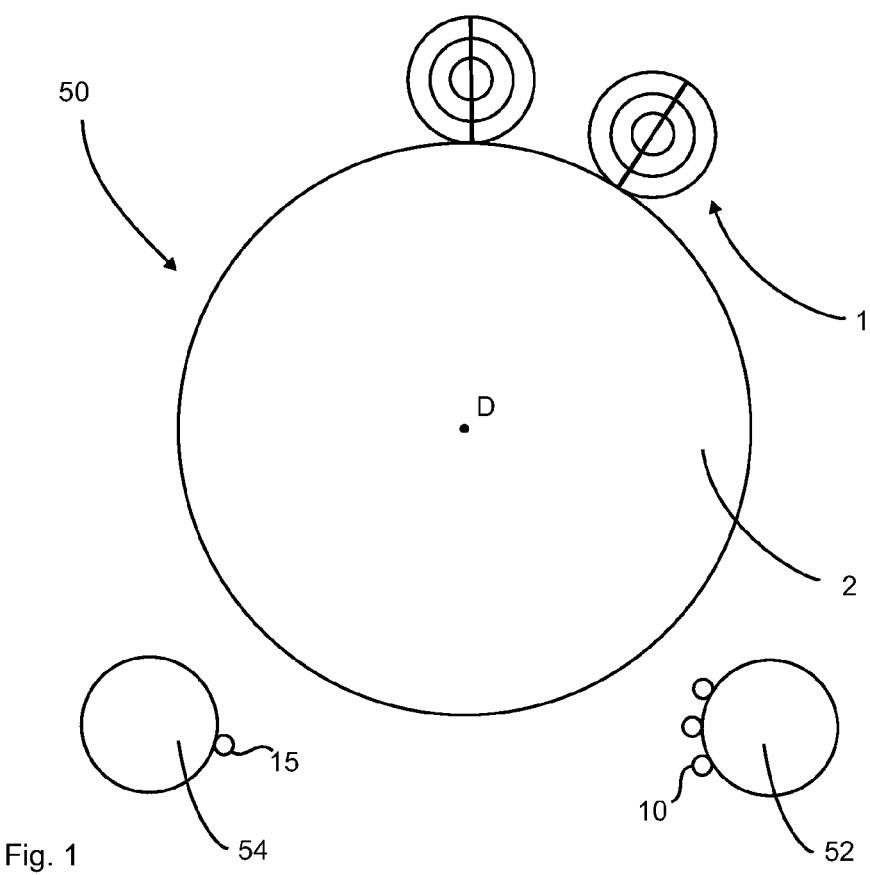

(51) Int. Cl.
   *B29C 49/30*   (2006.01)
   *B29C 49/12*   (2006.01)
   *B29L 31/00*   (2006.01)
   *B29K 105/00*   (2006.01)
   *B29C 49/06*   (2006.01)
   *B29C 49/28*   (2006.01)
   *B29C 49/36*   (2006.01)

(52) U.S. Cl.
   CPC .............. *B29C 2049/4864* (2013.01); *B29C 2049/4869* (2013.01); *B29C 2049/563* (2013.01); *B29K 2105/258* (2013.01); *B29L 2031/712* (2013.01)

(56) References Cited

U.S. PATENT DOCUMENTS

| | | |
|---|---|---|
| 6,733,272 B1 | 5/2004 | Derouault et al. |
| 2008/0020085 A1 | 1/2008 | Bianchini et al. |
| 2012/0091634 A1 | 4/2012 | Meinzinger et al. |
| 2013/0043622 A1 | 2/2013 | Hoellriegl |
| 2013/0193624 A1 | 8/2013 | Blochmann |
| 2015/0076748 A1 | 3/2015 | Meinzinger et al. |

FOREIGN PATENT DOCUMENTS

| | | |
|---|---|---|
| EP | 1880826 A1 | 1/2008 |
| FR | 2659265 A1 | 9/1991 |

\* cited by examiner

BLOW-MOULDING DEVICE WITH PRELOADABLE ATTACHMENT FOR BLOW MOULDS

CROSS-REFERENCE TO RELATED APPLICATIONS

This application claims priority to German Application No. 10 2014 107 512.9, having a filing date of May 28, 2014, the entire contents of which are hereby incorporated by reference.

FIELD OF TECHNOLOGY

The following relates to a device for transforming plastic preforms into plastic containers. Such devices and corresponding production methods have been known for a long time. Usually, a heated plastic preform is inserted into a blow mould and is expanded inside said blow mould through the application of compressed air. The respective blow mould or an inner wall thereof defines by its contour the contour of the container to be produced. When changing over to other containers, therefore, usually also the blow moulds themselves have to be changed. This changeover process is relatively time-consuming.

BACKGROUND

Usually, the blow-mould parts are held on blow-mould carrier shells and these carrier shells are in turn held on blow-mould carriers. When changing over to different container formats, in some cases the aforementioned carrier shells also have to be changed. This is also a laborious process.

In some known transforming devices for transforming plastic preforms into plastic containers, use is also made of so-called pressure cushions which press the two blow-mould parts against one another during the blowing process in order thus to counteract the internal pressure that occurs during the blowing process. During the blowing process, compressed air is usually applied to such pressure cushions in order to bring about this pushing-together. One problem during the process is often the return movement after the blowing process has taken place.

SUMMARY

An aspect relates to a transforming device for transforming plastic preforms into plastic containers and in particular plastic bottles, which on the one hand can be changed over in a short period of time but which on the other hand also enables or facilitates a pushing-together of the two blow-mould parts during the blow-moulding operation (and also a returning of at least one blow-mould part after the transforming operation). According to embodiments of the invention, this aspect is achieved by the subject matter of the independent claim. Advantageous embodiments and further developments form the subject matter of the dependent claims.

A transforming device according to embodiments of the invention for transforming plastic preforms into plastic containers comprises a blow-moulding device which in turn forms a cavity inside which the plastic preforms can be transformed into the plastic containers through the application of a flowable medium. The blow-moulding device has at least two side parts which are in turn arranged (at least indirectly) on the blow-mould carriers. The side parts of the blow mould are arranged at least indirectly on the blow-mould carriers by means of an attachment device.

According to embodiments of the invention, the attachment device also has a return means which, at least temporarily during a working mode, pushes at least one side part towards the blow-mould carrier on which said side part is arranged (or brings about a corresponding advancing movement and return movement).

In principle, it is possible that the blow mould or the side parts thereof are arranged directly on a carrier. However, it would also be possible that a blow-mould carrier shell is arranged on the carrier and the side part is in turn arranged on said blow-mould carrier shell. The invention is applicable to at least both embodiments. These two embodiments will in part be dealt with jointly below.

Said return means is thus in particular suitable and/or intended for bringing about this return movement of the blow-mould part towards the blow-mould carrier. Advantageously, the return means is an elastic element. In other words, said return means thus exerts a force which pushes or returns the side part and/or the blow-mould carrier shell towards the blow-mould carrier on which the blow-mould carrier shell having the side part is arranged.

Therefore, it is proposed in particular that the attachment device performs a dual function which encompasses, besides the attachment itself, also the returning of a blow-mould part and/or of a carrier shell part after the actual expansion process.

Said movement direction, in which the blow-mould part or the blow-mould carrier shell part is moved relative to the blow-mould carrier, preferably lies in a transport plane of the containers during the transforming operation. This movement direction preferably runs perpendicular to a longitudinal direction of the container to be expanded.

In order to expand the plastic preforms, first the two side parts of the blow mould are unfolded from one another, then the plastic preforms are introduced, then the blow mould is closed again and finally the plastic preforms are expanded inside the blow mould. The movement direction of said return movement preferably lies in that plane in which also the side parts are pivoted in order to open and close the blow mould.

In one preferred embodiment, a plurality of said transforming devices are arranged on a movable carrier and are transported by means of said carrier. The carrier is preferably a blowing wheel, on which a plurality of transforming devices are arranged.

In a further advantageous embodiment, the transforming device has a rod-like body, in particular a stretching rod, which can be introduced into the interior of the plastic preforms in order to stretch the latter in their longitudinal direction.

In a further advantageous embodiment, the transforming device also has an application device which applies the gaseous medium to the plastic preforms in order thus to expand the latter. This application device is in particular a so-called blowing nozzle which can be placed against a mouth of the plastic preforms in order thus to apply the gaseous medium thereto.

In a further advantageous embodiment, the transforming device has an advancing device which is suitable and intended for advancing or pushing one side part towards the other side part at least temporarily before or during the transforming process. The advancing device preferably has a so-called pressure cushion which is arranged, for example and preferably, between the blow-mould carrier and the blow-mould carrier shell or between the blow-mould carrier and the blow-mould part. By applying a flowable medium and in particular compressed air to this pressure cushion or area, (directly) the blow-mould parts arranged on the mould carrier or (indirectly) the blow-mould parts arranged on the mould carrier shell are moved or pressed towards one another. In this way, a gap between the moved parts (either the blow moulds or the mould carrier shells) can be reduced. This undesired gap would cause a seam in the container wall on the mould-blown container.

In a further advantageous embodiment, therefore, the advancing device has, in at least one intermediate space between the blow-mould carrier and the side part assigned thereto, a receiving chamber to which a flowable medium can be applied, as a result of the application of which the blow-mould carrier and the side part assigned thereto can be pushed apart. Advantageously, this is a receiving chamber to which a flowable medium, in particular a gaseous medium, can be applied. However, it would also be possible that this pushing-apart takes place via magnetic forces. Advantageously, this receiving chamber is arranged between the blow-mould carrier and the blow-mould carrier shell (this is preferred) and/or between the blow-mould carrier shell and the blow-mould part.

In a further advantageous embodiment, the attachment device, in a working mode of the transforming device, allows mechanical play between the blow-mould carrier and the blow-mould part arranged on said blow-mould carrier. As mentioned above, said blow-mould carrier shell is arranged in particular (but not necessarily) between the blow-mould part and the blow-mould carrier. Said relative movement and/or the mechanical play can accordingly also exist either between the blow-mould part and the blow-mould carrier shell or between the blow-mould carrier shell and the blow-mould carrier (or else also directly between the blow-mould carrier and the blow-mould part, if no blow-mould carrier shell is present). This mechanical play preferably exists in a direction perpendicular to a plane defined by a connecting plane between the two blow-mould parts in a closed state of the blow mould.

In a further advantageous embodiment, blow-mould carrier shells are attached to the blow-mould carriers by means of the attachment device and the blow-mould side parts are arranged on said blow-mould carrier shells, wherein the return means preferably pushes at least one blow-mould carrier shell towards the blow-mould carrier on which said blow-mould carrier shell is arranged.

In one preferred embodiment, one blow-mould carrier shell is arranged fixedly on the blow-mould carrier holding it (for example is screwed to the latter) and the other is movable relative to the blow-mould carrier holding it. The blow-mould carrier shells allow the holding of moulds of different size and make it easier to change the moulds or mould side parts. These blow-mould carrier shells may have temperature control bores which serve for cooling or heating (depending on the process) the moulds and thus the bottles.

In a further preferred embodiment, at least one blow-mould side part is in direct contact with a pressure cushion or the abovementioned receiving chamber to which the gaseous medium can be applied. Preferably, this may be the left-hand mould half of such a blow mould. This embodiment is used in particular when no blow-mould carrier shell part is present. Preferably at least one side part (and preferably both side parts) are in direct contact with the blow-mould carrier. In this embodiment, therefore, the blow mould (which is preferably configured as a full mould) also performs the function of the mould carrier shell.

In a further advantageous embodiment, at least one blow-mould carrier shell has a first surface facing towards the blow-mould carrier assigned to said blow-mould carrier shell and a second surface facing towards said blow-mould carrier, and both the first surface and the second surface each partially delimit a pressure cushion. Advantageously, therefore, two pressure cushions are provided here, which are preferably completely separate from one another. However, it would also be possible that connecting channels exist between these two pressure cushions. Planes in which said surfaces lie are preferably arranged at an angle to one another and are preferably at an angle of between 20° and 80°, preferably between 30° and 60°, to one another. The at least one attachment device is preferably arranged between said surfaces. Said two surfaces are preferably arranged in a V-shaped manner.

In a further advantageous embodiment, at least one return means comprises a spring element. By way of example, there may be provided on the attachment elements spring elements which bias the blow-mould carrier shell towards the blow-mould carrier and/or bias the blow-mould part towards the blow-mould carrier shell part or the blow-mould carrier. The pressure cushion additionally overcomes the force applied by said spring element. Preferably, the device has a plurality of such spring elements. Attachment devices may also be assigned to each of these spring elements. It is possible that the spring element is arranged around a bolt which serves to attach the blow-mould carrier shell. Preferably, the two blow-mould parts are arranged on the blow-mould carriers in the manner described above, wherein it is conceivable and preferred that the abovementioned pressure cushion is present only on one side. The spring element or elements that return the blow-mould carrier shells towards the blow-mould carriers are thus also preferably provided only on one side or only on one of the two blow-mould carriers.

In a further advantageous embodiment, the attachment device has a bayonet-type attachment element for attaching the blow-mould part to the blow-mould carrier part. This bayonet-type connection therefore preferably makes it possible to achieve an attachment but at the same time also permits a preloading of the aforementioned spring element.

Two of the above-described attachment devices may be present on each of the two blow-mould carriers. Preferably, these attachment devices are arranged one above the other in a longitudinal direction of the plastic preforms. Unlocking must therefore take place twice on each side for changeover purposes.

Preferably, it is possible that an attachment element, for example in the form of a bolt, is turned by a tool or a lever. As a result of the rotational movement, preferably a further attachment element, for example a cylindrical pin described in more detail below, which is attached transversely in the bolt, departs from a latching position in the bayonet and the form fit between the pin and the bayonet-like contour is released. The blow-mould carrier shell can then be removed. The bayonet remains (fixedly) on the blow-mould carrier shell, the spring on the bolt and the pin on the blow-mould carrier. The spring elements described above advantageously perform two tasks, namely the restoring or returning of the pressure cushion (but preferably only on one side of the mould carrier, for example the left-hand side of the mould carrier) and the mechanical biasing of the pin into the bayonet contour.

In a further advantageous embodiment, the attachment device at least of the mould carrier shell, optionally also both the attachment device of the mould carrier shell and of the blow mould or of the blow-mould part, can be actuated in an automated manner. Preferably, this actuation can take place via a central control system. In this way, it is possible that a release of the blow moulds can be initiated from the control system. This is particularly of interest also in connection with changeover devices such as changeover robots for example, which can carry out an automatic changeover of blow-mould parts.

In a further advantageous embodiment, the attachment device is actuated pneumatically. It is also possible that this actuation can take place for individual transforming stations, which as mentioned above are arranged on the carrier. In this way, the actuations of the attachment devices can take place in a station-related manner.

In a further advantageous embodiment, it is also possible that the actuation of the attachment device is carried out separately for the mould carrier shell and the blow-mould part.

In a further advantageous embodiment, it is conceivable that the actuation of the fixing of the blow-mould part is also coupled to an actuation of a fixing of the base. Preferably, therefore, the blow mould has, besides the aforementioned two side parts, also a base part which is suitable for shaping a container bottom. Preferably, this base part of the blow mould is also fixed to a carrier. In this case it is also possible that, here too, an attachment device is provided which can be automatically released or closed.

In a further advantageous embodiment, it is also possible to query an actuated position of the attachment device or fixing mechanisms from the control system, in particular to query whether a locked or attached position exists or an open or unlocked position.

In a further advantageous embodiment, an attachment device which arranges the blow-mould part on the blow-mould carrier extends through at least one section of the blow-mould carrier shell. In this way, both the blow-mould part and the blow-mould carrier shell part can be arranged on the carriers. Advantageously, a bayonet element of the attachment element engages in a blow-mould part.

In a further advantageous embodiment, the blow-mould carrier shell is held on the blow-mould carrier in a form-fitting and force-fitting manner and/or the mould carrier shell also holds the blow-mould part in a form-fitting and force-fitting manner. Preference is given to both the holding of the blow-mould carrier shell on the blow-mould carrier in a force-fitting and form-fitting manner and the holding of the blow-mould part on the blow-mould carrier shell.

In a further advantageous embodiment, at least one blow-mould carrier shell and preferably both blow-mould carrier shells has/have channels for conducting a temperature control medium. In this way, it is possible to control the temperature of the blow-mould parts and in particular to cool these and thus in particular also a wall which comes into contact with the plastic materials of the plastic container to be produced. Advantageously, coupling devices are provided for connecting a medium connection to the blow-mould carrier shell. Preferably at least two coupling devices are provided, by means of which a blow-mould carrier shell can be connected or coupled to an inflow line and a return line.

These coupling devices are preferably self-sealing coupling devices, in particular coupling plugs, which make it possible to connect the mould carrier shell to a temperature control medium and in particular also to a medium circuit.

In a further advantageous embodiment, a fixing of the mould carrier shell to the blow-mould carrier takes place substantially in the middle of the axis. In this case it is possible to achieve an advantageous distribution of forces as a result of such a fixing in the middle of the axis or in a centered position. A centering in the middle of the axis will be understood here to mean that this fixing is preferably performed in a plane of symmetry of the blow-mould part and/or of the blow-mould carrier.

A fixing of the blow mould in the mould carrier shell advantageously takes place in the middle of the axis.

In a further preferred embodiment, at least the fixing of the mould carrier shell to the mould carrier and/or the fixing of the blow mould to the blow-mould carrier shell takes place by way of an energy store. This energy store may be, for example, the spring element mentioned above which biases the blow-mould carrier shell and/or the blow-mould part towards the blow-mould carrier part.

In a further advantageous embodiment, at least one mould carrier shell has at least one force-deflecting element which diverts away any forces occurring during a transformation process, and in particular axial forces on the blow-mould carrier assigned to said mould carrier shell. Preferably, a step (as force-deflecting element) may be located on the mould carrier shell or there may be arranged on said mould carrier shell a step which, following placement of the mould carrier shell, diverts away any forces and in particular axial forces occurring on the blow-mould carrier as a result of the blowing process. Advantageously, a form-fitting diversion takes place on the mould carrier shell. The force-deflecting element is thus advantageously a step or a protrusion.

In a further advantageous embodiment, said step is configured in such a way that (particularly at the time of assembly) it is pressed in a form-fitting and force-fitting manner against a support face of the blow-mould carrier part.

In a further advantageous embodiment, a form-fitting connection exists between the blow-mould part or between the side part and the blow-mould carrier shell. There is preferably no mechanical play between the side part and the blow-mould carrier shell on which said side part is arranged.

In a further advantageous embodiment, at least one mould carrier shell has a V-shaped contour on a first side and a curved contour on a second side located opposite the first side. The first side is advantageously an outer side, that is to say the side of the mould carrier shell which in the assembled state is assigned to the blow-mould carrier part or lies opposite and faces towards said blow-mould carrier part. The second side is advantageously an inner side of the blow-mould carrier shell which in an assembled state faces towards the blow-mould part. The curved contour is advantageously a round, in particular circular, contour. It would also be possible, particularly when no blow-mould carrier shell is present, that the side part has a V-shaped outer contour. In particular, it is possible that each outer side has at least two respectively flat surface regions, wherein with particular preference these surface regions extend over more than half the total rear surface.

If no blow-mould carrier shells are present, it would also be possible that the blow-mould parts are configured as full moulds and have temperature control bores or temperature control channels which serve for conducting a temperature control medium. These temperature control bores may preferably be connected to temperature control circuits via media couplings and in particular via self-sealing media couplings. In this case it would be possible that articles for these media couplings are arranged on the respective blow-mould carrier part. In a further advantageous embodiment, these media connections can be connected and detached automatically, for instance when inserting the blow-mould part on the carrier part and/or when inserting the blow-mould part on the blow-mould carrier shell part. In this way, the use of changeover robots for changing the blow moulds can be permitted.

In a further advantageous embodiment, it is possible that the transforming stations have a guide device and in particular a sliding guide which is also able to absorb vertical forces, that is to say forces acting in the longitudinal direction of the plastic containers. Such forces may occur for example as a result of positioning a blowing nozzle. This guide device is preferably arranged on that side of the transforming stations which also has the abovementioned pressure cushions.

In a further advantageous embodiment, at least one blow-mould part is arranged via a rigid mould support on the blow-mould carrier part assigned to said blow-mould part. In a further advantageous embodiment, a blow-moulding device or a side part has at least one contour for forming a container. Preferably at least one side part has at least two such contours, so that two containers can be blown simultaneously by means of one blow-moulding device. In addition, the side part in question could also form more than two contours.

Embodiments of the present invention also relate to a method for transforming plastic preforms into plastic containers, wherein, by means of a blow-moulding device which forms a cavity, the plastic preforms are transformed into the plastic containers inside said cavity through the application of a flowable medium, wherein the blow-moulding device has at least two side parts which are arranged at least indirectly on blow-mould carriers, wherein the side parts are arranged on the blow-mould carriers by means of an attachment device. According to embodiments of the invention, the attachment device also has a return means which, at least temporarily during a working mode, pushes at least one side part (or, if present, at least one blow-mould carrier shell) towards the blow-mould carrier on which said side part or said blow-mould carrier shell is arranged.

With regard to the method too, therefore, it is proposed that the attachment device also serves to return the blow-mould carrier shell part. Preferably, one side part of the blow mould is pushed towards the other side part at least temporarily during the expansion process. This preferably takes place using a flowable medium and in particular a gaseous medium. Preferably, compressed air is fed to a pressure cushion which is arranged preferably between the blow-mould carrier shell and the blow-mould carrier on which said blow-mould carrier shell is arranged.

BRIEF DESCRIPTION

Figure 2:
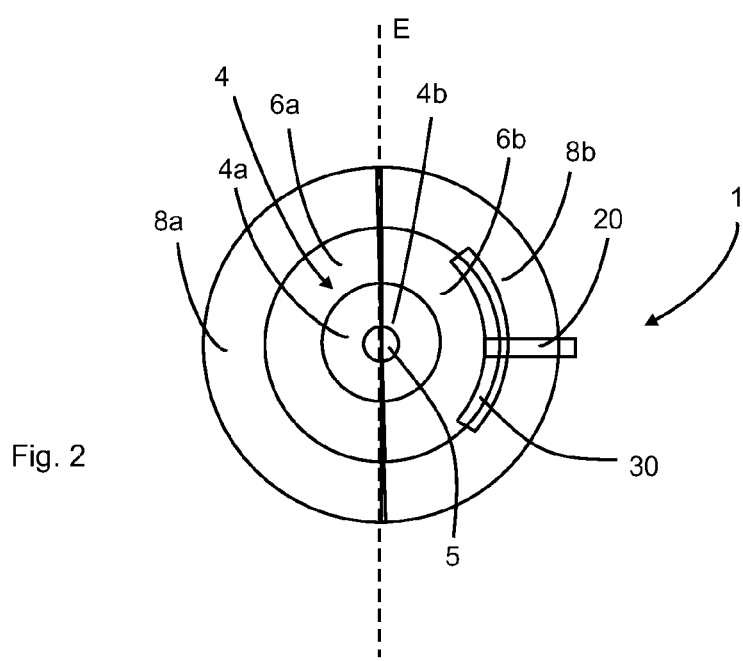
Figure 3:
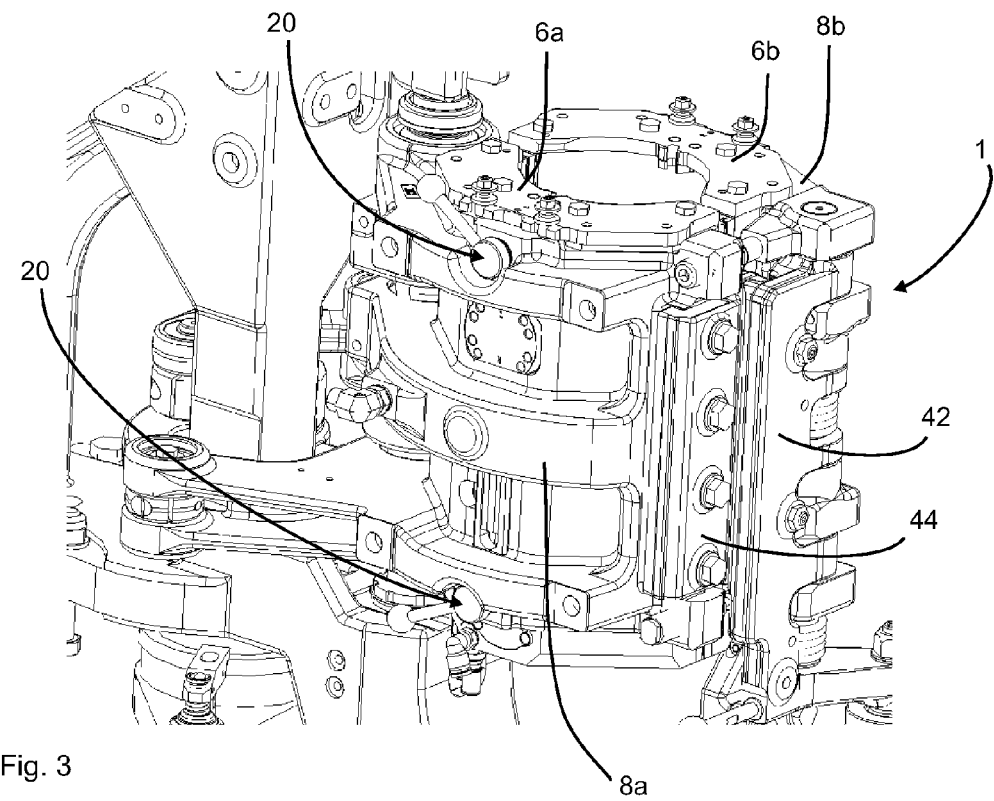
Figure 4:
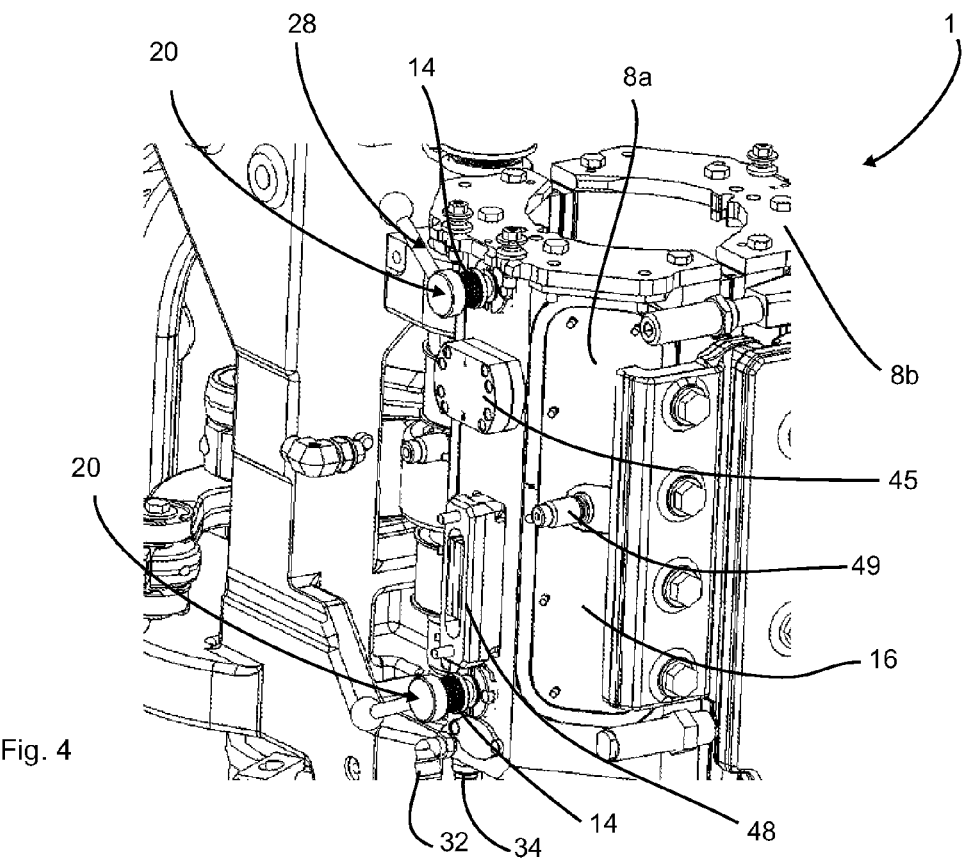
Figure 5:
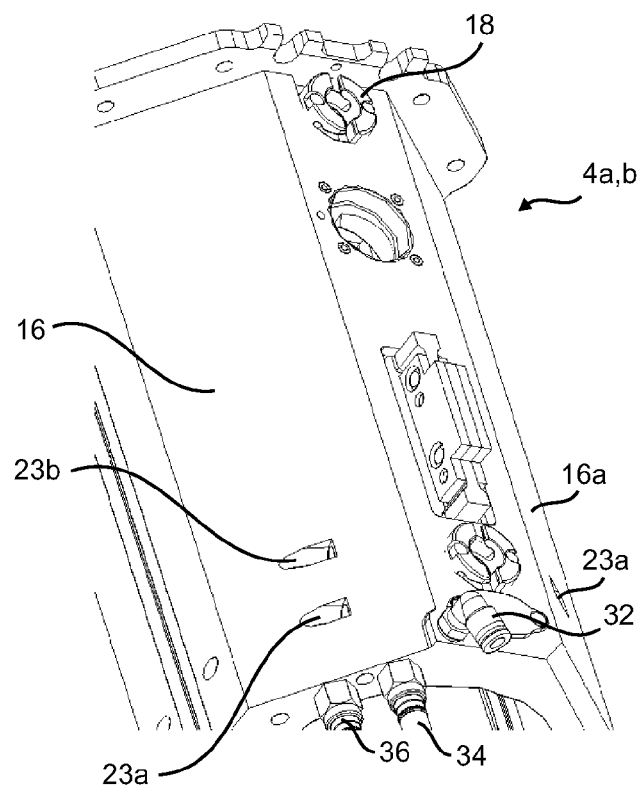
Figure 6:
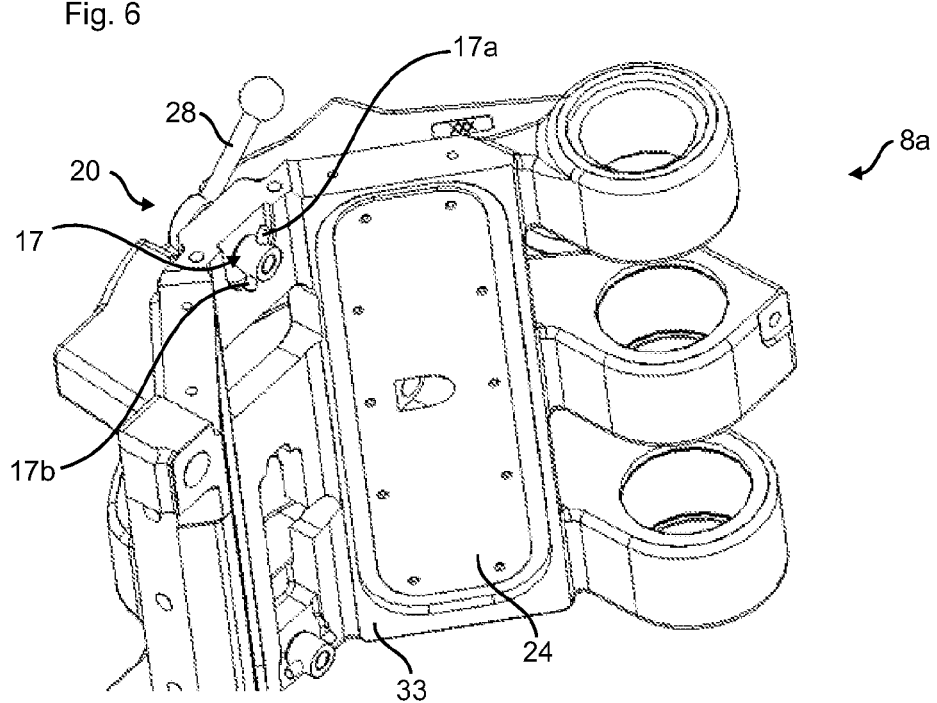
Figure 7:
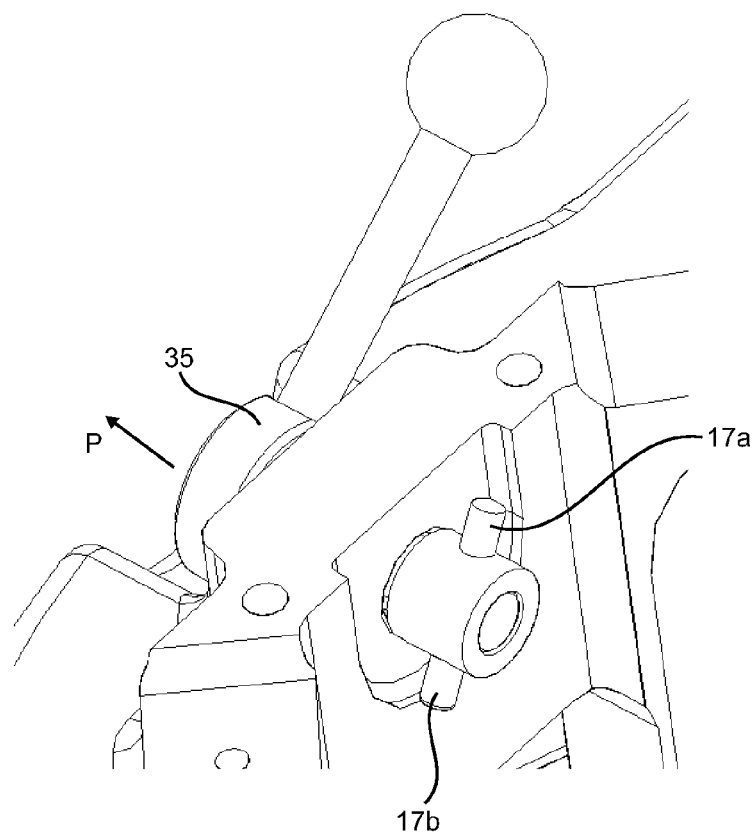
Figure 8:
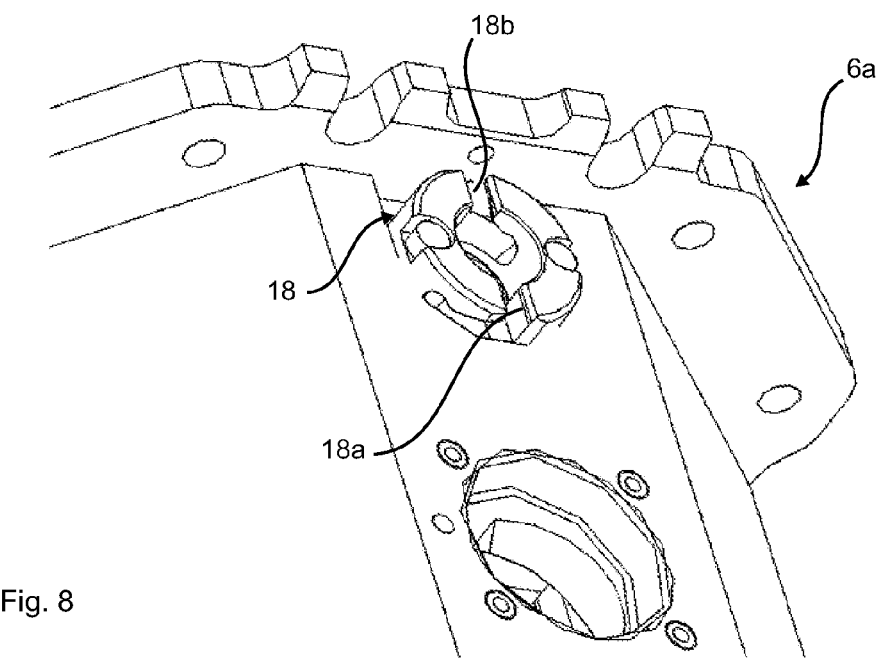
Figure 9:
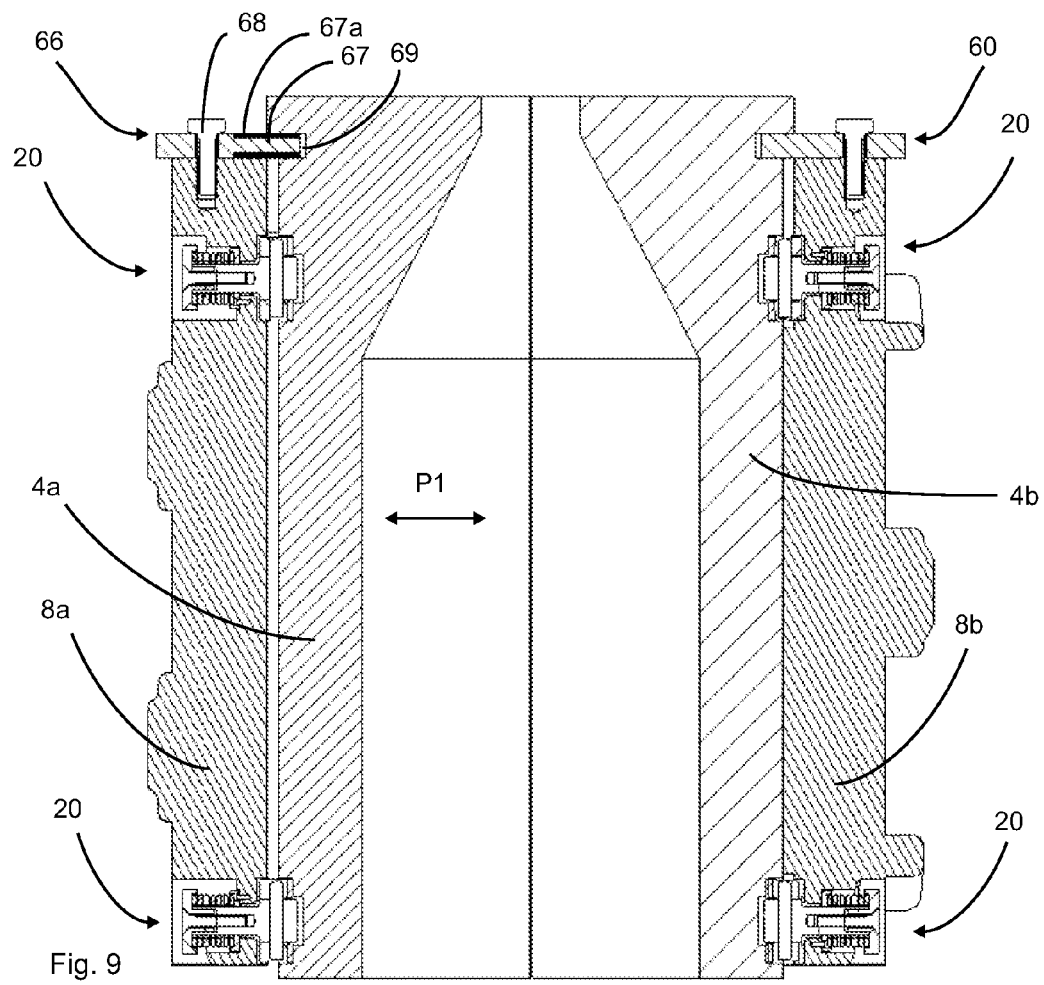
Figure 10:
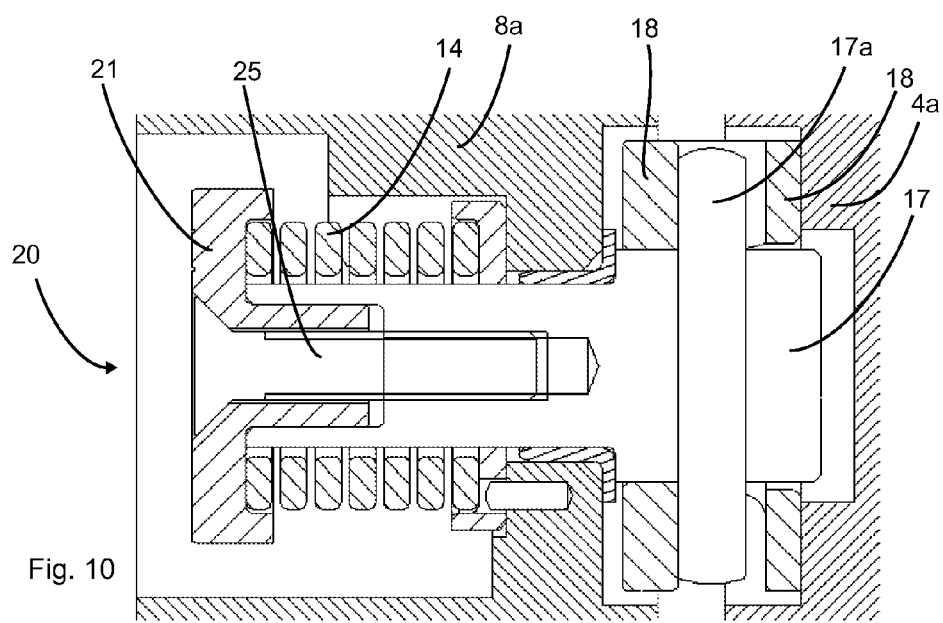
Figure 11:
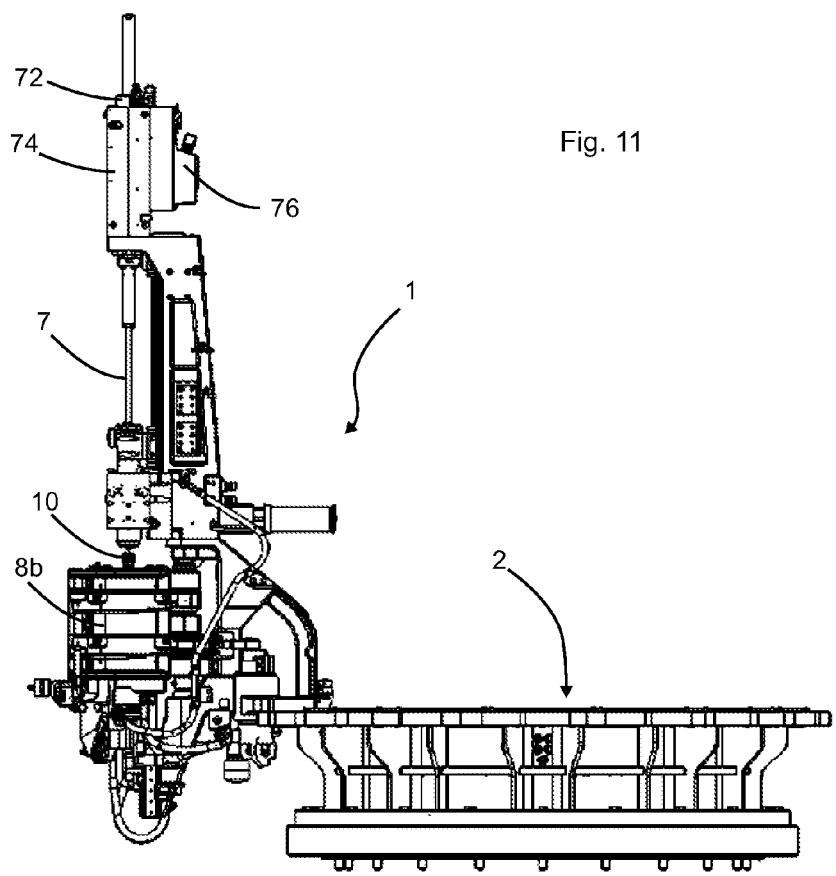
Figure 12A:
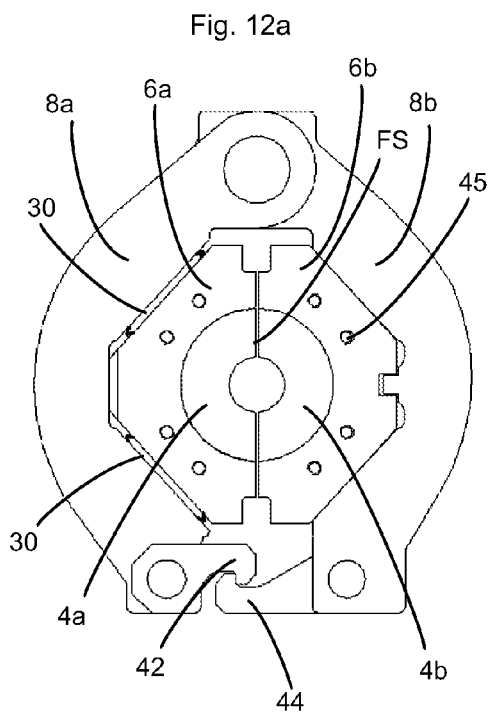
Figure 13:
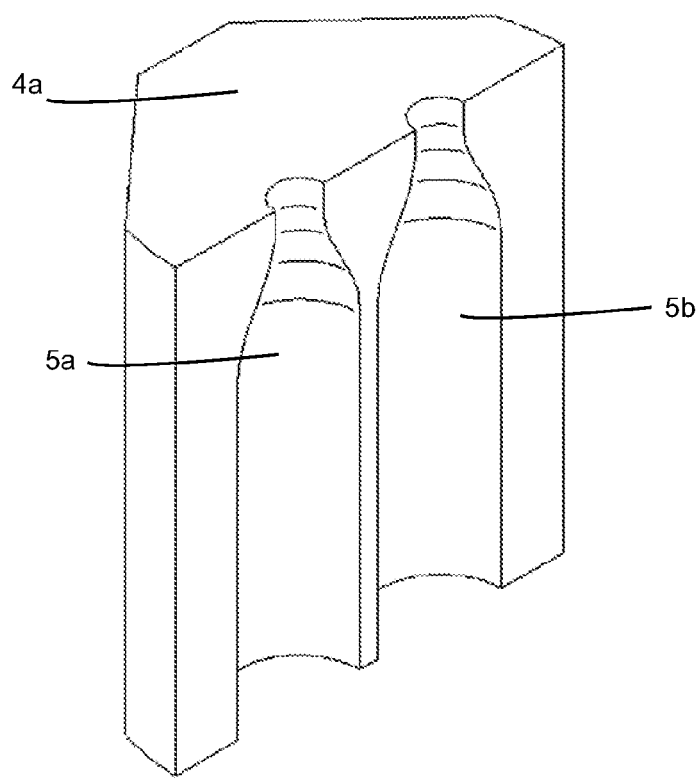

Some of the embodiments will be described in detail, with reference to the following figures, wherein like designations denote like members, wherein:

FIG. 1 shows a schematic diagram of a system for transforming plastic preforms into plastic containers;
FIG. 2 shows a schematic diagram of a transforming device;
FIG. 3 shows a view of a transforming device;
FIG. 4 shows a view of the transforming device of FIG. 3 with the blow-mould carrier removed;
FIG. 5 shows a diagram of a blow-mould carrier shell;
FIG. 6 shows a diagram of an inner side of a blow-mould carrier part;
FIG. 7 shows a detail of the diagram shown in FIG. 6;
FIG. 8 shows a detail of the diagram shown in FIG. 5;
FIG. 9 shows a sectional view of a blow mould arranged directly on a blow-mould carrier;
FIG. 10 shows a detail view of an attachment mechanism;
FIG. 11 shows a diagram of a transforming device arranged on a carrier;
FIGS. 12a, b show two embodiments of blow-moulding devices; and
FIG. 13 shows a diagram of a blow mould in a further embodiment.

DETAILED DESCRIPTION

FIG. 1 shows a highly schematic diagram of a system 50 for transforming plastic preforms 10 into plastic containers 15. The plastic preforms 10 are fed to the transforming device via a feed device, such as a feed starwheel 52 for example. This transforming device 1 has a carrier 2 which is able to rotate about an axis of rotation D and on which a plurality of transforming devices are arranged, in each case on the outer circumference. Only two transforming devices 1 have been shown here. After the transforming operation, the finished containers 15 are conveyed away via a discharge device, such as a discharge starwheel 54.

FIG. 2 shows a schematic diagram of a transforming device. Said transforming device has two blow-mould carriers 8a, 8b. Blow-mould carrier shells 6a, 6b are respectively arranged on said blow-mould carrier parts, and blow-mould side parts 4a, 4b, which are components of the blow-moulding device denoted 4 in its entirety, are in turn arranged on the blow-mould carrier shells 6a, 6b. To open and close the blow mould, the two blow-mould carriers 8a, 8b are unfolded from one another together with the blow-mould carrier shells arranged thereon and the blow-mould parts, so that a plastic preform 10 can be introduced into a cavity 5 that is formed between the blow-mould parts 4a, 4b. The plastic preform is then expanded inside this cavity.

Reference 20 denotes in a highly schematic manner an attachment device by which the blow-mould carrier shell 6b is arranged on the blow-mould carrier 8b. Reference 30 denotes, again in a highly schematic manner, a pressure cushion which can be filled for example with compressed air during the expansion process in order thus to push the blow-mould carrier shell part 6b away from the blow-mould carrier part 8b and in this way move the blow-mould part 4b arranged on said blow-mould carrier shell 6b towards the blow-mould part 4a.

As shown with reference to FIG. 2, this attachment element 20 is arranged in such a way that it extends perpendicular to a plane E that in the closed state is formed between the two blow-mould parts 4a and 4b. The attachment element 20 is also arranged centrally relative to the blow-mould carrier part 8b, and also relative to the blow-mould part 4b. In this way, a central introduction of force can be achieved. Reference 5 denotes the cavity inside which the plastic preforms are expanded to form the plastic containers.

FIG. 3 shows a more detailed diagram of a transforming device 1, but the blow-mould parts are not shown here. The blow-mould carrier shells 6a, 6b are respectively arranged on the blow-mould carriers 8a, 8b. Reference 42 denotes a first locking element, which is arranged pivotably on the blow-mould carrier part 8b. Said first locking element can engage in a further locking element 44 in order thus to lock the blow mould during the expansion process.

Reference 20 denotes in a highly schematic manner an attachment device by means of which the blow-mould carrier shell 6a is attached to the blow-mould carrier part 8a.

In the advantageous embodiment shown here, two such attachment devices are provided, which are arranged here one above the other.

FIG. 4 shows a further diagram of the device shown in FIG. 3, the blow-mould carriers having been removed here so that the blow-mould carrier shell part 6a and 6b can be seen directly.

Reference 34 denotes a connection by which a temperature control medium can be fed to the blow-mould carrier shell 8a. In addition, a second connection (not shown) is also provided for returning the temperature control medium. The second blow-mould carrier shell also has corresponding connections.

Reference 32 denotes a connection by means of which a pressure cushion can be supplied. To this end, there is formed on the blow-mould carrier shell part 6a a surface 16a which at the same time also delimits said pressure cushion. The pressure cushion is thus formed between the blow-mould carrier part (not shown in FIG. 4) and the carrier shell part 6a.

Reference 14 in FIG. 4 denotes a spring element which serves to bias the carrier shell part 6a towards the blow-mould carrier part 8a. Reference 28 here denotes a hand lever, by which the locking mechanism between the blow-mould carrier part and the carrier shell part can be released and locked.

Reference 48 denotes a U-shaped guide unit; the corresponding mating piece is screwed into the mould carrier shell. Reference 45 denotes a locking cassette which fixes and pneumatically secures the mould carrier shell. The cassette is fixedly screwed onto the mould carrier shell. Reference 49 denotes a throttle in the supply bore for the pressure cushion.

FIG. 5 shows a diagram of the blow-mould carrier shell 6a or 6b. It is once again possible to see here the connections 34 and 36 for supplying and conveying away the temperature control medium. In addition, it is also possible to see the connection 32, via which air can be supplied to the pressure cushion.

Also formed on the carrier shell part 6a, 6b, as mentioned above, are the surfaces 16, 16a which also form the pressure cushion. This pressure cushion can be supplied with compressed air via feed openings 23a, 23b.

It can be seen that the blow-mould carrier shell 6a, 6b is V-shaped here, that is to say the two surfaces 16, 16a are at an angle to one another. The introduction of force to attach the blow-mould carrier shell 6a, 6b to the blow-mould carrier part takes place between the two surfaces 16, 16a, that is to say centrally between said surfaces. The engagement means 18a, 18b, which form part of the bayonet 18, are used for this purpose.

FIG. 6 shows a diagram of the blow-mould carrier 8a. The attachment device 20 can once again be seen here. As mentioned above, this attachment device 20 has the lever 28, which brings about a rotation of an engagement means 17. Arranged on this engagement means 17 are two protrusions 17a and 17b which extend in the radial direction and which engage in corresponding engagement means or recesses 18a, 18b of the attachment element 18 (i.e. of the bayonet) in order to lock the carrier shell part. Both the engagement means 17 and the attachment element are thus components of the attachment device. The same also applies to the spring element 14.

Reference 24 denotes a surface of the blow-mould carrier part which cooperates with the surface 16 (cf. FIG. 5) of the carrier shell part 4a, 4b in order thus to form the pressure cushion.

Reference 33 denotes a peripheral sealing device, by means of which sealing can take place relative to the surface 16. In this way, the pressure cushion can be formed.

FIG. 7 shows an enlarged diagram of the blow-mould carrier part shown in FIG. 6. The return device or spring shown in FIG. 2 is not shown here but is located between the wall of the blow-mould carrier part and the main body 35 of the actuating device 20. In this way, the actuating device is pressed in FIG. 7 in the direction of the arrow P by the spring element. In this way, however, the blow-mould carrier shell (not shown) is also pushed towards the blow-mould carrier 8a and is returned again therefrom during the working process once pressure has ceased to be applied to the pressure cushion.

FIG. 8 shows a detail of the blow-mould carrier shell 6a. The engagement element 18 can once again be seen here. This engagement element 18 has two grooves 18a and 18b, in which the two protrusions 17a and 17b (cf. FIG. 7) engage. By rotating the lever 28, the blow-mould carrier shell 6a and the blow-mould carrier part 8a can in this way be pulled closer towards one another. The locking is thus made possible.

FIG. 9 shows a diagram of two side parts 4a, 4b arranged on blow-mould carrier parts 8a, 8b. Reference 20 in each case denotes the attachment device which holds the side parts 4a, 4b directly on the blow-mould carrier parts 8a, 8b. In the embodiment shown in FIG. 9, therefore, no blow-mould carrier shell is provided which is arranged between the blow-mould carrier parts 8a, 8b and the side parts 4a, 4b.

Reference 66 denotes a further guide mechanism which guides a movement of the side part 4a relative to the blow-mould carrier part 8a in the direction P1. This guide mechanism 66 is at one side arranged on, for example screwed onto, the blow-mould carrier part 8a via an attachment means 68. At the other side, this guide mechanism 66 has a protrusion 67 extending here in the direction P1, that is to say in a radial direction. Arranged on this protrusion 67, which engages in a recess 69 arranged on the blow-mould part 4a, is a sliding layer 67a which enables easy movement of the blow-mould part 4a relative to the blow-mould carrier part 8a. The lefthand blow-mould part 4a is thus arranged such as to be able to move relative to the blow-mould carrier part 8a in the direction of the arrow P1.

The second side part 4b is rigidly arranged on the blow-mould carrier part 8b assigned thereto. Instead of a guide mechanism, here a securing mechanism 60 is provided which, in addition to the attachment device 20, secures the blow-mould side part 4b, that is to say the right-hand side part, relative to the blow-mould carrier part 8b.

In general, preferably at least one side part 4a, 4b is arranged on the blow-mould carrier part 8a, 8b assigned thereto via at least two attachment devices 20 which are preferably arranged one above the other.

FIG. 10 shows a detailed diagram of an attachment device 20. Here, the engagement element 18 in the form of a bayonet sleeve is fixedly screwed onto the respective side part 4a. By rotating an adjusting nut 21, the engagement means or cylindrical pins slide along the guide surface of the bayonet sleeve 18. In this way, a preloading of the spring element 14 is generated, which pulls the side part 4a towards the blow-mould carrier part 8a. In this way, a detachable connection is obtained between the side part 4a and the blow-mould carrier part 8a, the connection force being defined by the preloading of the spring element 14. This connection force can be varied by way of a screw 25.

In the working mode, the spring force is overcome by actuating the pressure cushion and the side part 4a executes a horizontal movement towards the mid-point of the blowing station so as to minimize the mould gap to the respective other side part. Once the pressure of the pressure cushion has been released, the spring element 14 returns the side part to the original position.

FIG. 11 shows a further diagram of a transforming device 1 arranged on a carrier 2, such as, in particular, a blowing wheel. Here, reference 10 again denotes a plastic preform and reference 7 denotes a stretching rod which serves to stretch the plastic preforms in their longitudinal direction. Reference 72 denotes a drive device such as, in particular, a linear motor which generates a movement of the stretching rod in the longitudinal direction of the plastic preforms 10. Reference 72 denotes a cooling device for cooling the drive device 72, and reference 76 denotes a control device for controlling the drive device, such as, in particular but not exclusively, an inverter.

Figure 12B:
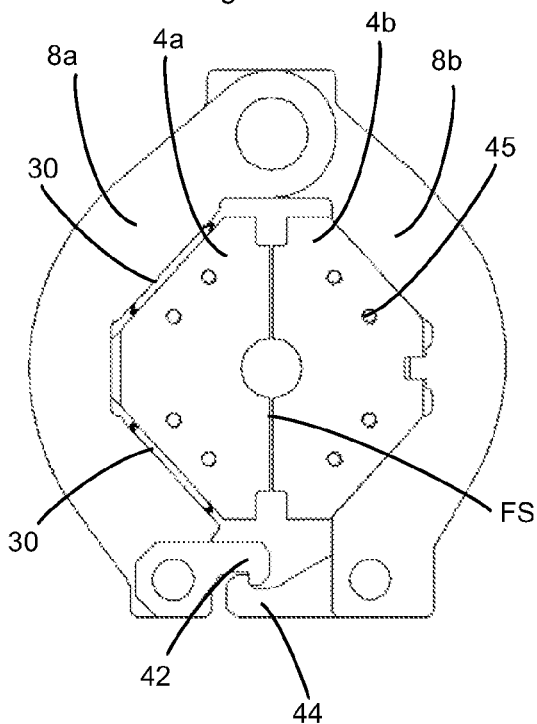

FIGS. 12*a*, 12*b* show two possible embodiments of blow-moulding devices arranged on a blow-mould carrier. In the embodiment shown in FIG. 12*a*, the blow-mould parts 4*a*, 4*b* are respectively arranged on the blow-mould carrier parts 8*a*, 8*b* via blow-mould carrier shells 6*a*, 6*b*. One or more pressure cushions 30 are formed here between the blow-mould carrier part 8*a* and the blow-mould carrier shell part 6*a* arranged on said blow-mould carrier part 8*a*. Also provided in the blow-mould carrier shell parts 6*a*, 6*b* are temperature control bores 45, through which a flowable temperature control medium can flow.

In the embodiment shown in FIG. 12*b*, the blow mould is or the side parts 4*a*, 4*b* of the blow mould are arranged directly on the respective blow-mould carrier parts 8*a*, 8*b*. A pressure cushion 30 is thus formed here directly between the blow-mould carrier part 8*a* and the side part 4*a* arranged on said blow-mould carrier part 8*a*. Reference 45 again denotes temperature control bores or channels, through which a flowable temperature control medium can flow. Reference FS in each case denotes the mould gap, which can be minimized by the pressure cushion 30. The blow mould or the side parts 4*a* and 4*b* thereof are configured as so-called "full moulds", which simultaneously perform the functions of the mould carrier shells (missing here) and the actual blow mould. The full moulds thus also have a V-shaped outer contour, as well as a corresponding pressure cushion arrangement.

FIG. 13 shows a further diagram of a side part 4*a*. Here, this side part has two cavities for forming plastic bottles. FIG. 13 thus shows a double cavity, by means of which two containers can be blown (in particular substantially simultaneously).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES

1 transforming device
2 carrier
4*a*, 4*b* blow-mould side parts
4 cavity
5*a*, 5*b* cavity
6*a*, 6*b* blow-mould carrier shells
8*a*, 8*b* blow-mould carrier parts
10 plastic preforms
14 spring element
15 plastic containers
16, 16*a* surface
17 engagement means
17*a*, 17*b* protrusions
18 engagement element
18*a*, 18*b* engagement means
20 attachment device
21 adjusting nut
23*a*, 23*b* feed openings
24 surface
25 screw
28 lever
30 pressure cushion
32, 34 connections
33 peripheral sealing device
35 main body
36 feed connection
42 first locking element
44 further locking element
48 guide unit
49 throttle
50 system
52 feed starwheel
54 discharge starwheel
60 securing mechanism
66 guide mechanism
67 protrusion
67*a* sliding layer
68 attachment means
69 recess
72 drive device
74 cooling device
76 control device
D axis of rotation
E plane
P arrow
P1 movement direction

The invention claimed is:

1. A transforming device for transforming plastic preforms into plastic containers, comprising a blow-moulding device which forms a cavity inside which the plastic preforms can be transformed into the plastic containers through the application of a flowable medium, wherein the blow-moulding device has at least two side parts which are arranged at least indirectly on blow-mould carriers, wherein the side parts are arranged at least indirectly on the blow-mould carriers by an attachment device, wherein the attachment device also has a return which, at least temporarily during a working mode, pushes at least one side part towards the blow-mould carrier on which said side part is arranged, and wherein the attachment device has a bayonet-type attachment element for attaching the blow-mould part to the blow-mould carrier part.

2. The transforming device according to claim 1, wherein the transforming device has an advancing device which is suitable and intended for pushing one side part towards the other side part at least temporarily before or during a transforming operation.

3. The transforming device according to claim 2, wherein the advancing device has, in at least one intermediate space between the blow-mould carrier and the side part assigned thereto, a receiving chamber to which a flowable medium can be applied, as a result of the application of which the blow-mould carrier and the side part assigned thereto can be pushed apart.

4. The transforming device according to claim 1, wherein the attachment device, in a working mode of the transforming device, allows mechanical play between the blow-mould carrier and the blow-mould part arranged on said blow-mould carrier.

5. The transforming device according to claim 1, wherein blow-mould carrier shells are attached to the blow-mould carriers by the attachment device and the side parts are arranged on said blow-mould carrier shells, wherein the return preferably pushes at least one blow-mould carrier shell towards the blow-mould carrier on which said blow-mould carrier shell is arranged.

6. The transforming device according claim 1, wherein at least one blow-mould carrier shell has a first surface facing towards the blow-mould carrier assigned to said blow-mould carrier shell and a second surface facing towards said blow-mould carrier, and both the first surface and the second surface each partially delimit a pressure cushion.

7. The transforming device according to claim 1, wherein at least one return comprises a spring element.

8. The transforming device according to claim 6, wherein the spring element is preloaded to push the blow-mould part and/or the blow-mould carrier shell towards the blow-mould carrier part.

9. The transforming device according to claim 1, wherein the blow-mould carrier shell is held on the blow-mould carrier in a form-fitting and force-fitting manner and/or the blow-mould carrier shell also holds the blow-mould part in a form-fitting and force-fitting manner.

10. The transforming device according to claim 1, wherein at least one blow-mould carrier shell has channels for conducting a temperature control medium.

11. The transforming device according to claim 1, wherein there is arranged on at least one blow-mould carrier shell at least one force-deflecting element which diverts away any forces occurring during a transformation process, in particular axial forces on the blow-mould carrier assigned to said blow-mould carrier shell.

12. The transforming device according to claim 1, wherein at least one mould carrier shell has a V-shaped contour on a first side and a curved contour on a second side located opposite the first side.

13. A method for transforming plastic preforms into plastic containers, comprising the steps of: providing a blow-moulding device which forms a cavity, such that the plastic preforms are transformed into the plastic containers inside said cavity through the application of a flowable medium, providing with the blow-moulding device at least two side parts which are arranged at least indirectly on blow-mould carriers, wherein the side parts are arranged on the blow-mould carriers, wherein the attachment device also has a return and a bayonet-type attachment element for attaching the blow-mould part to the blow-mould carrier part and at least temporarily during a working mode, pushing at least one side part towards the blow-mould carrier on which said side part is arranged.

* * * * *